United States Patent
Pratap et al.

(10) Patent No.: US 10,930,943 B2
(45) Date of Patent: Feb. 23, 2021

(54) FUEL CELL SYSTEM INCLUDING INDUCTIVE HEATING ELEMENT AND METHOD OF USING SAME

(71) Applicant: BLOOM ENERGY CORPORATION, Sunnyvale, CA (US)

(72) Inventors: Aniket Pratap, Mumbai (IN); Siddharth Patel, Jabalpur (IN); Sumit Raj, Patna (IN); Shraddesh Malviya, Mumbai (IN); Mosur K. Premkumar, Mumbai (IN); Arne Ballantine, Palo Alto, CA (US); Martin Perry, Mountain View, CA (US); Michael Petrucha, Santa Clara, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 50 days.

(21) Appl. No.: 16/217,558

(22) Filed: Dec. 12, 2018

(65) Prior Publication Data

US 2019/0214660 A1    Jul. 11, 2019

Related U.S. Application Data

(60) Provisional application No. 62/614,574, filed on Jan. 8, 2018.

(51) Int. Cl.
*H01M 8/04007* (2016.01)
*H01M 8/04701* (2016.01)
(Continued)

(52) U.S. Cl.
CPC ... *H01M 8/04037* (2013.01); *H01M 8/04022* (2013.01); *H01M 8/04225* (2016.02);
(Continued)

(58) Field of Classification Search
CPC ................................................ H01M 8/04037
See application file for complete search history.

(56) References Cited

U.S. PATENT DOCUMENTS

| 3,749,980 A | 7/1973 | Baxter |
| 4,329,174 A | 5/1982 | Ito et al. |

(Continued)

FOREIGN PATENT DOCUMENTS

| JP | H 11-287441 A | 10/1999 |
| JP | 2003-148731 A | 5/2003 |

(Continued)

OTHER PUBLICATIONS

International Search Report and Written Opinion received in connection with international application No. PCT/US2013/070505; dated Feb. 14, 2014, 12 pages.

(Continued)

*Primary Examiner* — James Lee
(74) *Attorney, Agent, or Firm* — The Marbury Law Group, PLLC

(57) ABSTRACT

A fuel cell system and method of operating the same, the system including: a fuel cell stack and a reaction zone configured to receive a fuel/air mixture; an electromagnetic induction glow plug configured to heat the fuel/air mixture; and an alternating current (AC) generator configured to provide an AC voltage to the glow plug. The glow plug includes a housing extending outside of the hotbox, a heating element disposed in the housing, and a coil coiled around the housing, electrically connected to the AC generator, and configured to inductively heat the heating element.

9 Claims, 8 Drawing Sheets

(51) Int. Cl.
*H01M 8/0612* (2016.01)
*H01M 8/2475* (2016.01)
*H01M 8/04225* (2016.01)
*H01M 8/04014* (2016.01)
*H01M 8/0662* (2016.01)

(52) U.S. Cl.
CPC ..... *H01M 8/04708* (2013.01); *H01M 8/0618* (2013.01); *H01M 8/0631* (2013.01); *H01M 8/0662* (2013.01); *H01M 8/2475* (2013.01)

(56) References Cited

U.S. PATENT DOCUMENTS

| | | |
|---|---|---|
| 4,592,134 A | 6/1986 | Walton |
| 4,943,494 A | 7/1990 | Riley |
| 5,741,605 A | 4/1998 | Gillett et al. |
| 6,227,157 B1 * | 5/2001 | Baumgartner ............ F02B 9/00 123/145 A |
| 6,512,204 B1 | 1/2003 | Chiu et al. |
| 6,689,990 B2 | 2/2004 | Taniguchi et al. |
| 6,844,525 B2 | 1/2005 | Yoshikawa et al. |
| 8,563,180 B2 | 10/2013 | Perry et al. |
| 8,877,399 B2 | 11/2014 | Weingaertner et al. |
| 8,921,001 B2 | 12/2014 | Huynh et al. |
| 2002/0170903 A1 | 11/2002 | Taniguchi et al. |
| 2002/0195443 A1 | 12/2002 | Tanaka et al. |
| 2004/0137302 A1 | 7/2004 | Gilman et al. |
| 2006/0263665 A1 | 11/2006 | Schaevitz et al. |
| 2009/0029205 A1 * | 1/2009 | Venkataraman .. H01M 8/04014 429/411 |
| 2009/0266135 A1 | 10/2009 | Knaup |
| 2010/0009221 A1 | 1/2010 | Ballantine et al. |
| 2010/0122975 A1 | 5/2010 | Burrows et al. |
| 2010/0133253 A1 | 6/2010 | Walker, Jr. |
| 2010/0147822 A1 | 6/2010 | Burrows et al. |
| 2010/0167154 A1 | 7/2010 | Ono |
| 2012/0202130 A1 | 8/2012 | Weingaertner et al. |
| 2012/0270117 A9 | 10/2012 | Venkataraman et al. |
| 2014/0162162 A1 | 6/2014 | Kalika et al. |
| 2015/0288006 A1 | 10/2015 | Arcelona et al. |

FOREIGN PATENT DOCUMENTS

| | | |
|---|---|---|
| JP | 2004-107135 A | 4/2004 |
| JP | 2012-512373 A | 5/2012 |
| JP | 2013-055008 A | 3/2013 |
| JP | 2014-057759 A | 3/2014 |
| WO | WO 94/03305 A1 | 2/1994 |

OTHER PUBLICATIONS

Promat Freeflow®, Free Pouring Granules of High Temperature Insulation, http://www.microtherm.uk.com/landingpage/assets/TDS_FREEFLOW_V1-EN.pdf, Nov. 2013.
International Search Report and Written Opinion received in connection with International Application No. PCT/US2015/022122, dated Jul. 31, 2015, 15 pages.
International Preliminary Report on Patentability for International Search Report for PCT/US2015/022122, dated Oct. 13, 2016, 14 pages.
First Office Action from Japan Patent Office for Japanese Patent Application No. 2016-556296, dated Aug. 7, 2018, 4 pages.

* cited by examiner

FUEL CELL SYSTEM INCLUDING INDUCTIVE HEATING ELEMENT AND METHOD OF USING SAME

FIELD

The present invention is directed to fuel cell systems and methods, and more specifically, to a fuel cell system including an inductive heating element.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

Various exemplary embodiments provide a fuel cell system comprising a fuel cell stack and a reaction zone configured to receive a fuel/air mixture; an electromagnetic induction glow plug configured to heat the fuel/air mixture; and an alternating current (AC) generator configured to provide an AC voltage to the glow plug.

Various embodiments provide a method of heating a fuel cell system including a hotbox housing a fuel cell stack, the method comprising: applying an alternating current (AC) voltage to a primary coil disposed outside of the hotbox; inductively heating a heating element using the AC voltage; and heating the fuel/air mixture in a reaction zone of the fuel cell system using heat generated by the heating element.

DETAILED DESCRIPTION

Figure 1:
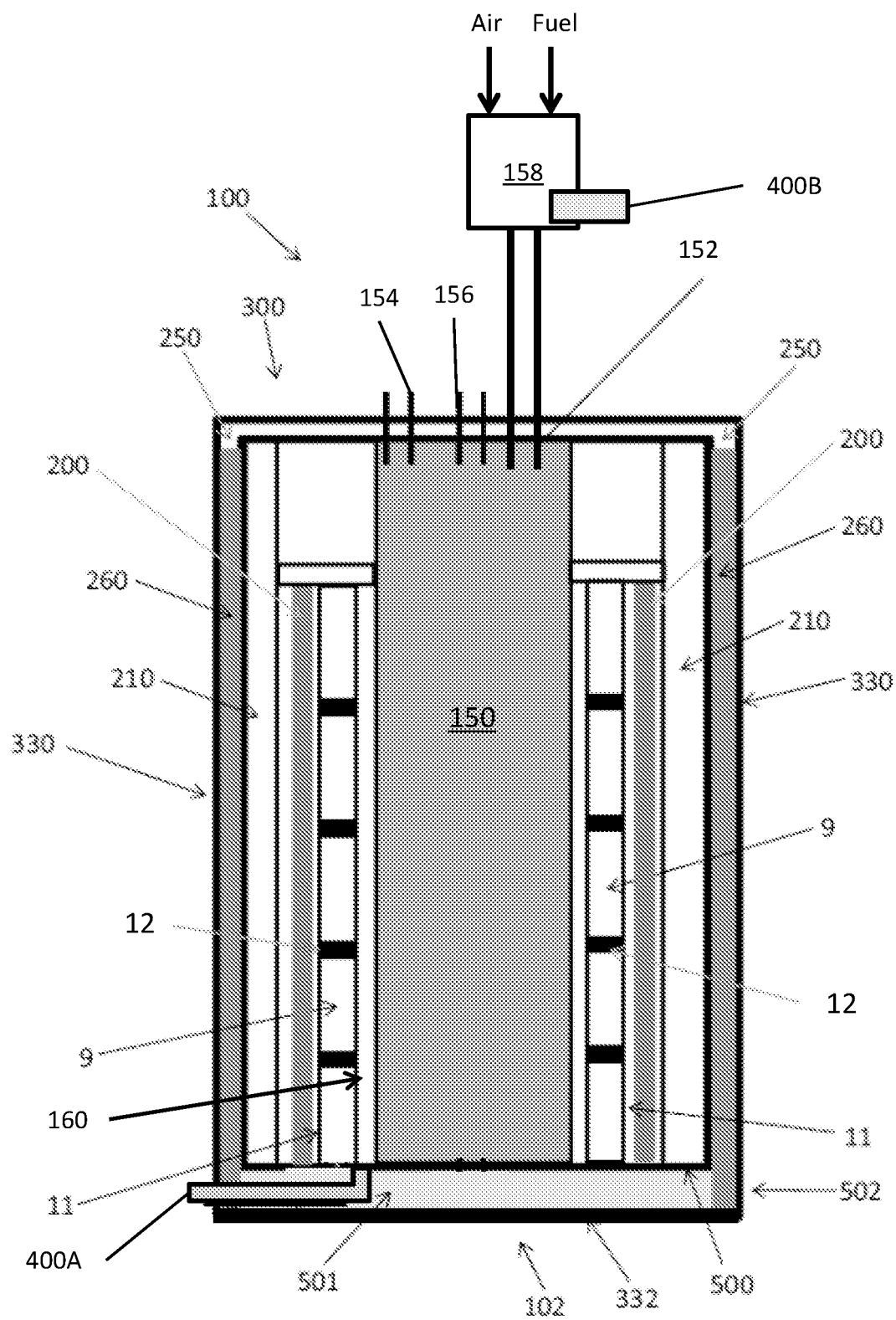
FIG. 1 is a schematic illustration of a cross section of a fuel cell system according to an exemplary embodiment.

To maintain a high operating efficiency, a desired temperature of the fuel cell system components should be maintained throughout operation. However, gaps within layers in the fuel cell hot box and instrumentation feed-through holes may introduce significant heat leaks, resulting in undesired temperature variation. Additionally, high temperature operation and variations in temperatures may cause stress and damage to fuel cell system components.

Components such as glow plugs may be inserted through feed-through holes in a hotbox of a fuel cell system. Glow plugs are fuel cell components having a heating element that provides heat for initiating fuel cell system operation. Glow plugs are typically inserted into a reaction chamber of a fuel cell system, often contained within a housing of a glow plug assembly. For example, glow plugs may be inserted into a catalytic partial oxidation reactor (CPDX) or an anode tail gas oxidizer (ATO) of a fuel cell system, and may operate to initiate oxidation reactions during system startup. Because glow plugs are provided into reaction chambers through feed-through holes, the glow plugs or heating elements that are inserted into the reaction chambers should be sealed to prevent leaks that may occur between the element and the housing (e.g., hotbox) that supports the element and facilitates insertion. Further, components in or near the reaction chambers may be exposed to extreme operating temperatures, and extreme variations of temperature. Because of extreme temperature conditions and variations, differences in coefficients of thermal expansion (CTEs) between housing components and heating elements may cause stresses leading to micro-crack formation in the heating elements, which may shorten the life of the heating elements, may give rise to leaks, and may reduce the operational reliability and longevity of the fuel cell system.

Conventionally, glow plugs are resistive heating-based elements. Current applied to such elements results in Joule heating, which may be used to heat an air-fuel mixture an initiate partial oxidation in the CPDX inside a hotbox and/or oxidation of a fuel/air mixture in the ATO, during startup of a fuel cell system. In order to operate, a conventional glow plug is electrically connected to a power supply using wire leads. However, during steady-state operation, a glow plug may be exposed to high temperatures, which may oxidize brazing used to connect the wire leads. Such oxidation may result in an open circuit condition, leading to the deactivation of the glow plug.

Embodiments of the present invention are drawn to electromagnetic inductive glow plugs and fuel cell systems, such as solid oxide fuel cell (SOFC) systems, including the same. The inductive glow plugs provide improved failure resistance compared to conventional resistive glow plugs.

Induction heating is the process of heating an electrically conducting heating element (usually a metal) by electromagnetic induction using an electrically conductive coil. In particular, an oscillating magnetic field (e.g., a high-frequency alternating current (AC)) is applied to the heating element, resulting in the generation of eddy currents within the heating element. Electrical resistance in the heating element results in Joule heating of the heating element.

Eddy currents are circular electric currents induced within conductors by a changing magnetic field in the conductor, due to Faraday's law of induction. Eddy currents flow in closed loops within conductors, in planes perpendicular to the magnetic field. They can be induced within nearby stationary conductors by a time-varying magnetic field created by an AC electromagnet or transformer, for example, or by relative motion between a magnet and a nearby conductor. The magnitude of the current in a given loop is proportional to the strength of the magnetic field, the area of the loop, and the rate of change of flux, and inversely proportional to the resistivity of the material. Under certain assumptions (uniform material, uniform magnetic field, no skin effect, etc.) the power lost due to eddy currents per unit mass for a thin sheet or wire can be calculated from the following equation:

$$P = \frac{\pi^2 B_p^2 d^2 f^2}{6k\rho D},$$

In the equation, P is the power lost per unit mass (W/kg), Bp is the peak magnetic field (T), d is the thickness of the sheet or diameter of the wire (m), f is the frequency (Hz), k is a constant equal to 1 for a thin sheet and 2 for a thin wire, p is the resistivity of the material ($\Omega$m), and D is the density of the material (kg/m$^3$).

According to Lenz's law, an eddy current creates a magnetic field that opposes the magnetic field that created it, and thus eddy currents react back on the source of the magnetic field. Thus, eddy currents may be used to heat objects in induction heating.

Heat may also be generated by magnetic hysteresis losses in heating element materials that have significant relative permeability, such as ferromagnetic materials. The frequency of AC used may depend on the heating element size, material type, coupling between the coil and the heating element and the penetration depth of the electric field.

FIG. 1 is a cross section illustrating a first embodiment of a fuel cell system 100. The system 100 includes one or more columns 11 of fuel cell stacks 9 located on a stack support base 500. Each fuel cell stack 9 includes one or more fuel cells as described in the U.S. patent application Ser. No. 13/344,304, hereby incorporated by reference in its entirety. Fuel manifolds 12 may be located between the fuel cell stacks 9 in the columns 11. The columns 11 of fuel cell stacks 9 may be arrayed about a central plenum 150. The central plenum 150 may include various balance of plant components, such as a reformer and/or heat exchanger, such as an anode cooler heat exchanger and/or an anode exhaust gas recuperator (not shown). The central plenum 150 of the system 100 also includes a fuel input conduit 152, an oxidant (e.g. air) input conduit 154, and a fuel/oxidant exhaust output conduit 156 (e.g., anode tail gas oxidizer output comprising fuel exhaust oxidized by the oxidant exhaust.

The fuel cell system 100 may also include a cathode recuperator heat exchanger 200 located about an outer periphery of the columns 11 of fuel cell stacks 9. To insulate the fuel cell system 100 from heat loss, a resilient insulating layer 210 may be provided in the gap between the cathode recuperator 200 and a sidewall 330 of a hot box 300 (e.g. outer housing) of the fuel cell system 100. To further insulate the fuel cell system 100, a compliant insulating layer 260 may be provided in gap 250 between the resilient insulating layer 210 and the sidewall 330 of the outer housing 300 of the fuel cell system 100. The resilient insulation layer 210 may be made of any suitable thermally insulating resilient material, such as a pourable material, e.g., a free flow material or a solid granular material. The compliant layer 260 may be made of any suitable material, such as thermally resistant felt, paper, or wool. As used herein, a "compliant" material is a material that compresses and expands by at least 10 volume percent without damage. A base cavity 102 that is at least partially defined by stack support base 500, the bottom wall 332 of the base pan 502 of the housing 300 and the sidewall 330 of the outer housing 300, may be filled with a base insulation 501, such as a microporous board, a pourable insulation, or a combination thereof. In an exemplary embodiment, the base insulation 501 fills one quarter or less of the volume of the base portion cavity 102 of the housing 300.

The fuel cell system 100 may include an anode tail gas oxidizer (ATO) 160 having an outlet fluidly connected to the inlet of the cathode recuperator heat exchanger 200, whose outlet is connected to the exhaust output conduit 156. The ATO 160 may be located between the fuel cell stacks 9 and the central plenum 150. The ATO 160 is configured to oxidize fuel exhaust received from the fuel cell stacks 9 using oxidant exhaust received from the fuel cell stacks 9 via one or more conduits. The fuel cell system 100 may include a catalytic partial oxidation (CPDX) reactor 158 connected to the fuel input conduit 152. The CPDX reactor 158 may be configured to partially oxidize fuel during system startup, so as to increase the temperature of the fuel cell system 100. The ATO 160 and the CPDX reactor 158 may comprise fuel oxidation catalyst coated conduits.

The fuel cell system 100 may include one or more electromagnetic induction glow plugs configured to heat fuel and oxidant mixtures in one or more reaction zones in the fuel cell system 100. For example, the fuel cell system 100 may include a glow plug 400A that extends through the hotbox 300 and is operatively connected to the ATO 160. The glow plug 400A may be configured to heat an air/fuel mixture provided to the ATO 160 at least during startup of the fuel cell system 100, such that oxidation of the fuel (e.g., hydrogen and/or hydrocarbon fuel which remains in the stack 9 fuel exhaust stream) of the mixture occurs in the ATO 160. The oxidized mixture is then provided from the ATO 160 into the cathode recuperator heat exchanger 200. The glow plug 400A may be operated only during system 100 start-up or during both start-up and steady-state operation of the system 100. The glow plug 400A is not limited to extending through any particular location in the sidewall 330. For example, the glow plug 400A may be disposed in any suitable position for heating and/or initiating oxidation in the ATO 160.

In various embodiments, the fuel cell system 100 may additionally or alternatively include a glow plug 400B operatively connected to the CPDX reactor 158. The glow plug 400B may be configured to heat a fuel and/or oxidant mixture provided to the CPDX reactor 158 during system startup, to initiate a partial oxidation reaction in the CPDX reactor 158.

Figure 2:
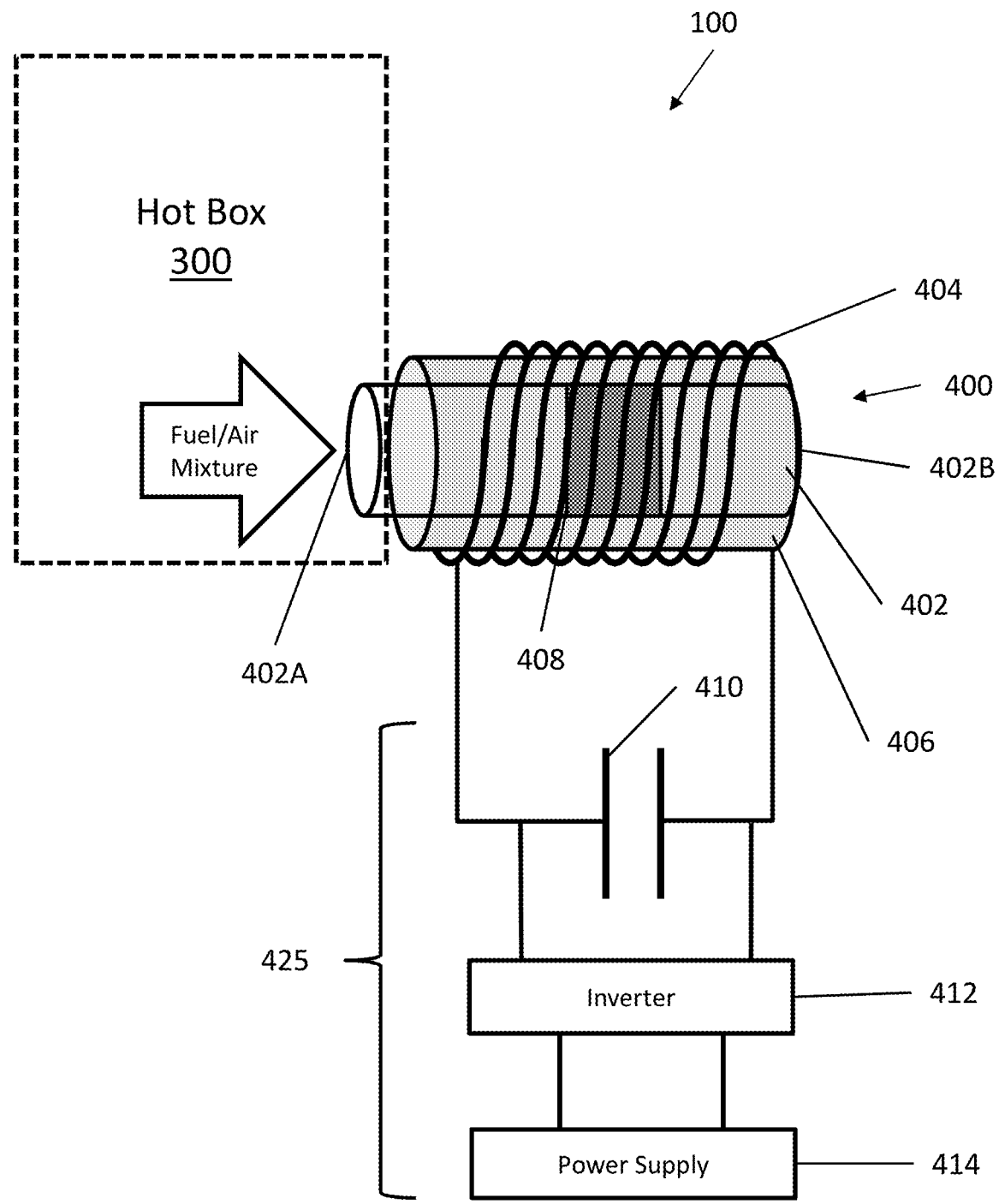
FIG. 2 is a schematic illustration of a fuel cell system including an electromagnetic induction glow plug, according to another exemplary embodiment.

FIG. 2 is a schematic diagram of the fuel cell system 100, wherein the glow plug 400 is enlarged to show components thereof, according to various embodiments of the present disclosure. Referring to FIG. 2, the glow plug 400 includes a housing 402, an electrically conductive coil 404, a sheath 406, and a heating element 408. The housing 402 may extend from the hotbox 300 of FIG. 1. In various embodiments, the housing 402 may be formed of a metal and may be electrically conductive. In some embodiments, the housing 402 may be a portion of, or integrated with, the hotbox 300. For example, the housing 402 and the outer housing 300 may be formed of the same material.

The housing 402 may be in the form of a hollow chamber having any suitable shape. For example, the housing 402 may be cylindrical or prismatic. The housing 402 may have an open end 402A configured to receive an air/fuel mixture from a reaction zone (e.g., the ATO 160) in the hotbox 300, and an opposing closed end 402B disposed outside of the hotbox 300. In particular, the open end 402A may be inserted into a reaction zone in the hotbox 300, so as to receive a fuel/air mixture from the reaction zone.

The sheath 406 may be formed of a dielectric material and may be configured to prevent electrical shorting between the housing 402 and the coil 404 and/or between the heating element 408 and the coil 404. In some embodiments, the sheath 406 may be formed of a ceramic material such as a ceramic matrix composite (CMC) material or the like. However, the sheath 406 may be formed of any dielectric material capable of withstanding high temperatures, such as fuel cell system operating temperatures.

The coil 404 may be wrapped around the sheath 406 and/or the housing 402, and may be configured to generate magnetic flux in the heating element 408. The coil 404 may be formed of any suitable electrically conductive material, such as an electrically conductive metal wire or the like. For example, the coil 404 may be formed of copper, nickel-clad copper, nickel, or an Inconel alloy (e.g., a Ni—Cr—Fe based alloy).

The heating element 408 may be disposed in the center of the coil 404 inside of the housing 402. The heating element 408 may formed of any ferromagnetic material having a relatively high magnetic permeability and oxidation resistance. For example, the heating element 408 may be formed of an Inconel alloy, or mu metal (e.g., a Ni—Fe based soft magnetic alloy), or the like. The heating element 408 may be disk-shaped, in some embodiments. However, the heating element 408 is not limited to any particular shape. For example, the heating element 408 may be bar-shaped, rod-shaped, etc. In some embodiments, a long axis of the heating element 408 may be oriented at about 90 degrees with respect to the magnetic flux generated by the coil 404, in order to provide a maximal amount of inductive heating.

The coil 404 may be electrically connected to a high-frequency alternating current (AC) generator 425 configured to apply a high-frequency AC voltage to the coil 404. The AC generator 425 may be disposed outside of the hot box 300 at any location having a temperature of less than about 100° C., such as a temperature ranging from about room temperature to about 40° C., during fuel cell system operation. In some embodiments, the coil 404 and wiring to the AC generator 425 may be protected from fuel cell operating temperatures to avoid wire degradation and/or delamination. In some embodiments, the AC generator 425 may include a capacitor 410, an inverter 412 electrically connected to the capacitor 410, and a power supply or source 414 electrically connected to the inverter 412. The capacitor 410 and the coil 404, which functions as an inductor, may be electrically connected to the inverter 412 in parallel and may operate as a resonant circuit.

The inverter 412 may be a full bridge inverter or a half bridge inverter. The inverter 412 may have an operating frequency ranging from about 100 to about 300 kHz, such as from about 180 to about 240 kHz, or about 220 kHz. However, the present disclosure is not limited to any particular operating frequency, so long as the frequency is sufficient to heat the heating element 408 to a temperature sufficient to initiate combustion of a fuel/air mixture. For example, the heating element 408 may be heated until red hot.

The power supply 414 may be configured to supply a direct current (DC) voltage to the inverter 412. For example, the power supply 414 may be an energy storage unit such as a battery. In some embodiments, the power supply 414 may be charged using power generated by fuel cells of the system 100. In some embodiments, the power supply 414 may supply a 20 to 28 volt DC voltage, such as a 22 to 26 volt DC voltage, or a 24 volt DC voltage, to the inverter 412. The power supply 414 may have a Wattage ranging from about 100 Watts to about 200 Watts, according to some embodiments. However, the power supply 414 is not limited to any particular voltage or Wattage, so long as the supplied current is sufficient for the heating element 408 to initiate combustion of a fuel/air mixture.

Figure 3:
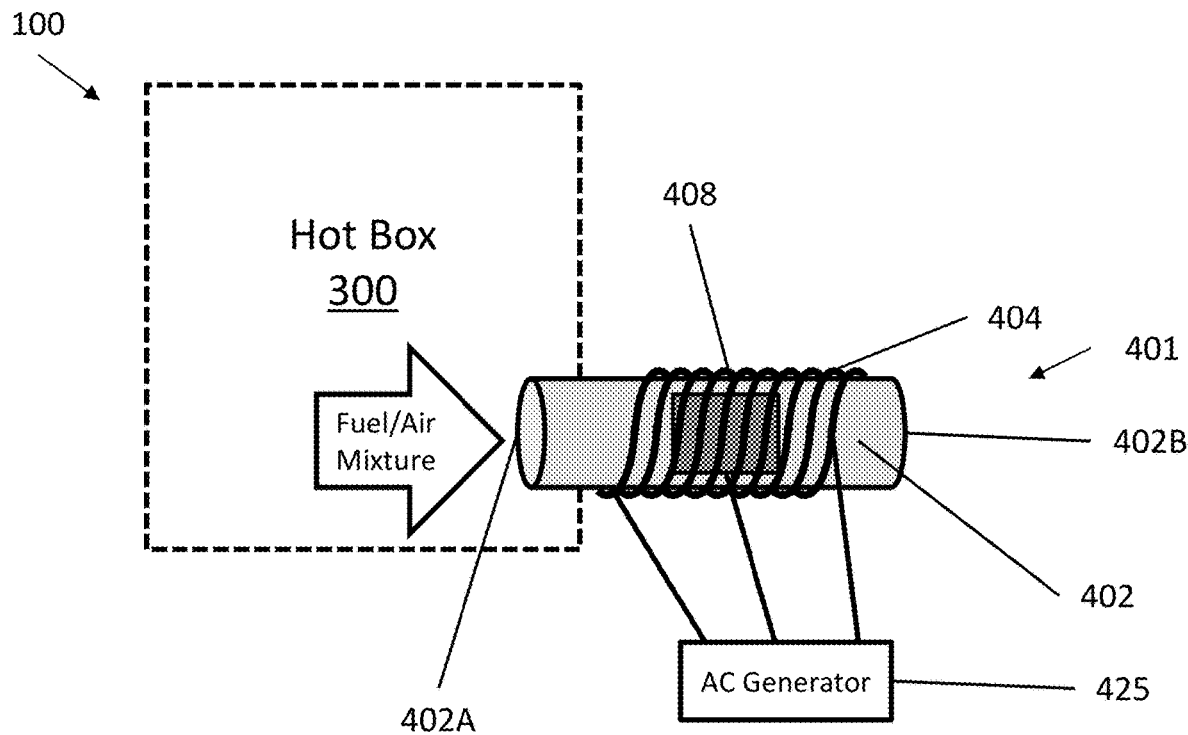
FIG. 3 is a schematic illustration of a fuel cell system including an electromagnetic induction glow plug, according to another exemplary embodiment.

FIG. 3 is a schematic diagram of a fuel cell system 100, including an electromagnetic induction glow plug 401, according to various embodiments of the present disclosure. The glow plug 401 has been enlarged for illustrative purposes and includes elements similar to the elements described with respect to the glow plug 400 of FIG. 2, so only differences there between will be discussed in detail.

Referring to FIG. 3, a housing 402 of the glow plug 401 is formed of a dielectric material, rather than an electrically conductive material. For example, the housing 402 may be formed of a ceramic material, similar to the sheath 406 of FIG. 2. A coil 404 may be wrapped directly around the housing 402. Since the housing 402 is non-conductive, the housing 402 may prevent electrical shorting of a heating element 408 disposed in the housing 402 and the coil 404. As such, the sheath 406 may be omitted.

Figure 4:
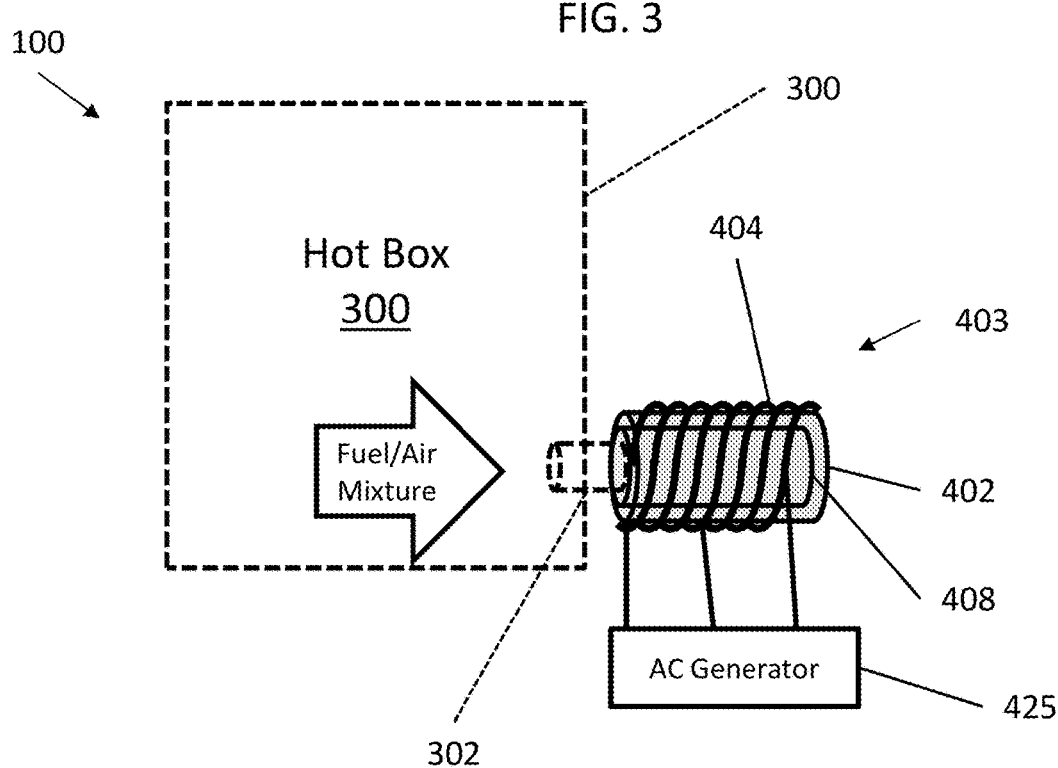
FIG. 4 is a schematic illustration of a fuel cell system including an electromagnetic induction glow plug, according to another exemplary embodiment.

FIG. 4 is a schematic diagram of a fuel cell system 100, including an electromagnetic induction glow plug 403, according to various embodiments of the present disclosure. The glow plug 403 has been enlarged for illustrative purposes and includes elements similar to the elements described with respect to the glow plug 400 of FIG. 2, so only differences there between will be discussed in detail.

Referring to FIG. 4, the glow plug 403 includes a housing 402 disposed around a heating element 408. A coil 404 is wrapped around the housing 402 and connected to an AC generator 425. The coil 404 may be configured to inductively heat the heating element 408, and there by heat and/or ignite a fuel/air mixture in a reaction chamber of the hotbox 300.

The heating element 408 may be an electrically conductive end portion of an inlet port 302 that protrudes from the hotbox 300. For example, the inlet port 302 may be similar to a glow plug port configured to receive a conventional glow plug. Therefore, the glow plug 403 may be retrofit onto a conventional fuel cell system hotbox. Since the heating element 408 is formed from a portion of the port 302, a separate heating element may be omitted.

According to some embodiments, the heating element 408 may be a portion of the port 302 that has a larger diameter than a remaining portion of the port 302, such that a long axis of the heating element 408 is aligned substantially perpendicular to a magnetic field generated by the coil 404.

Figure 5:
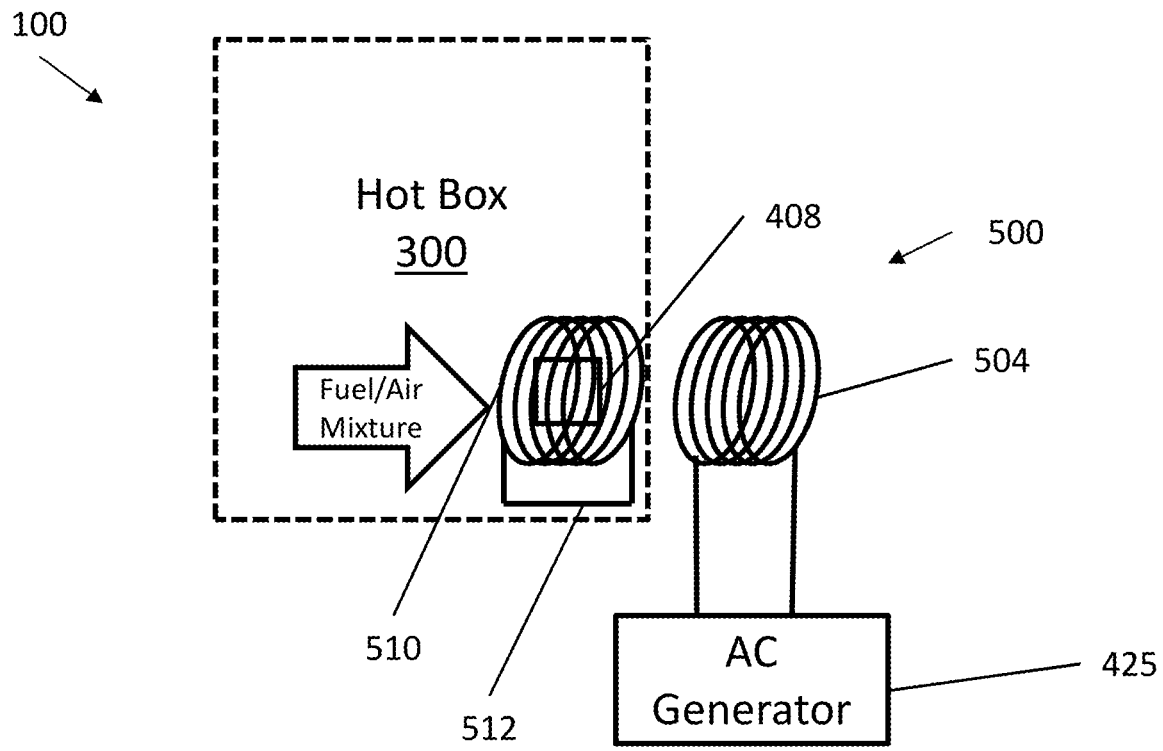
FIG. 5 is a schematic illustration of a fuel cell system including an electromagnetic induction glow plug, according to another exemplary embodiment.

FIG. 5 is a schematic diagram of a fuel cell system 100, including an electromagnetic induction glow plug 500, according to various embodiments of the present disclosure. The glow plug 500 has been enlarged for illustrative purposes and includes elements similar to the elements described with respect to the glow plug 400 of FIG. 2, so only differences there between will be discussed in detail.

Referring to FIG. 5, the glow plug 500 includes a conductive primary coil 504 that is electrically connected to an AC generator 425, and is disposed outside of the hotbox 300. Accordingly, the primary coil 504 may not be exposed to high-temperature operating conditions inside the hotbox 300.

The glow plug 500 may also include a conductive secondary coil 510 disposed inside of the hotbox 300 adjacent to the primary coil 508. The secondary coil 510 surrounds a heating element 408 disposed in a reaction zone inside the hotbox 300. The secondary coil 510 may be electrically shorted by an electrical contact 512 connected to opposing ends of the secondary coil 510. The electrical contact 512 may operate to facilitate current flow through the secondary coil 510.

In operation, the AC generator 425 applies a high frequency AC voltage to the primary coil 504 to generate an electric field. The electric filed generated by the primary coil 504 induces an AC voltage in the secondary coil 510 and a corresponding electric field. The electric field generated by the secondary coil 510 inductively heats of the heating element 408. The heating element 408 may then heat and/or ignite a fuel/air mixture present in the reaction zone of the hotbox 300.

Figure 6:
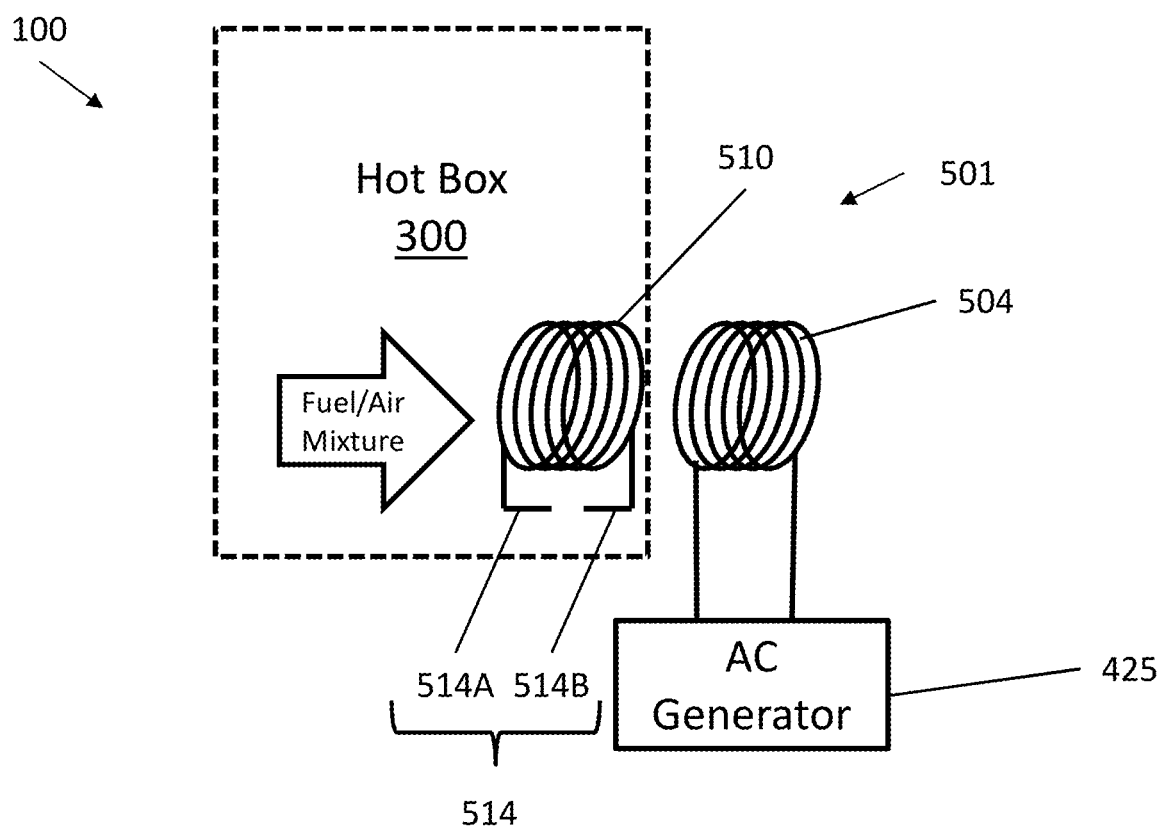
FIG. 6 is a schematic illustration of a fuel cell system including an electromagnetic induction glow plug, according to another exemplary embodiment.

FIG. 6 is a schematic diagram of a fuel cell system 100, including an electromagnetic induction glow plug 501, according to various embodiments of the present disclosure. The glow plug 501 has been enlarged for illustrative purposes and includes elements similar to the elements described with respect to the glow plug 500 of FIG. 5, so only differences there between will be discussed in detail.

Referring to FIG. 6, the glow plug 501 includes a primary coil 504 disposed outside of the hotbox 300 and electrically connected to an AC generator 425. Accordingly, the primary coil 504 may not be exposed to high-temperature operating conditions existing inside the hotbox 300.

A secondary coil 510 is disposed inside of the hotbox 300, adjacent to the primary coil 504. The secondary coil 510 may be electrically connected to a heating element 514 disposed in a reaction zone of the hotbox 300. The heating element 514 may include electrical contacts 514A, 514B connected to opposing ends of the secondary coil 510. Free ends of the contacts 514A, 514B may be separated by a gap.

In operation, the AC generator 425 is configured to apply a high frequency AC voltage to the primary coil 504 to generate an electric field. The electric filed formed by the primary coil 504 induces an AC voltage in the secondary coil 510. The induced AC voltage may be configured to generate a spark between the free ends of the contacts 514A, 514B. The spark may ignite the fuel/air mixture in the reaction zone of the hotbox 300.

Figure 7A:
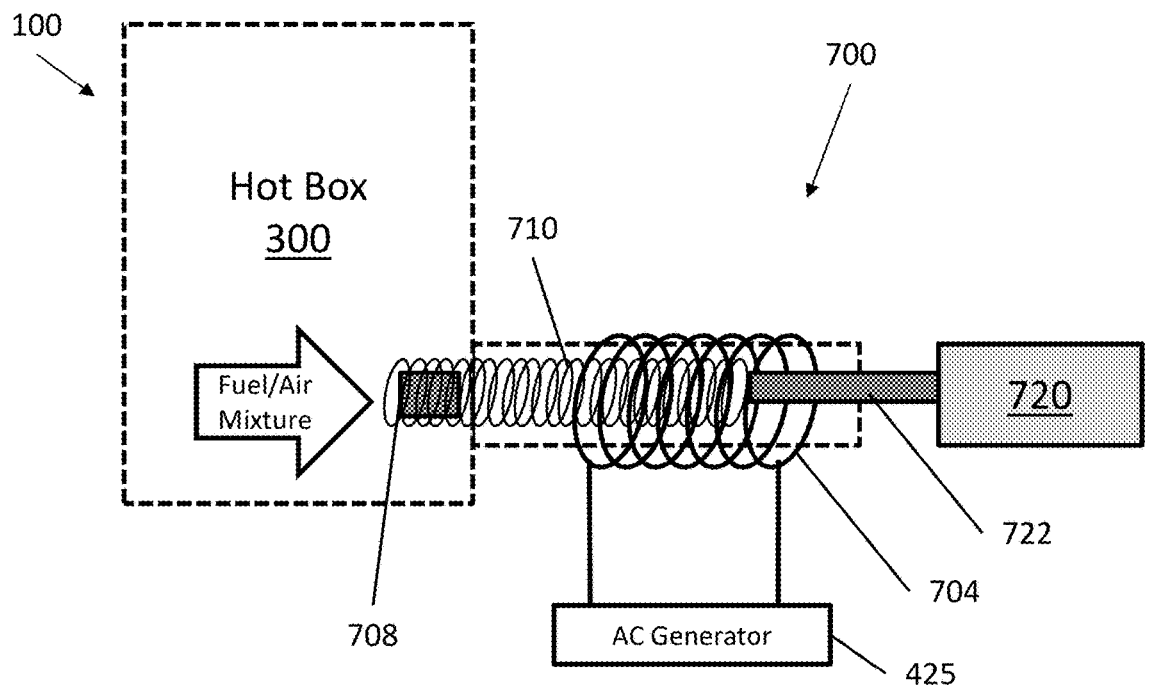
FIGS. 7A and 7B are schematic illustration of a fuel cell system including an electromagnetic induction glow plug, according to another exemplary embodiment.
Figure 7B:
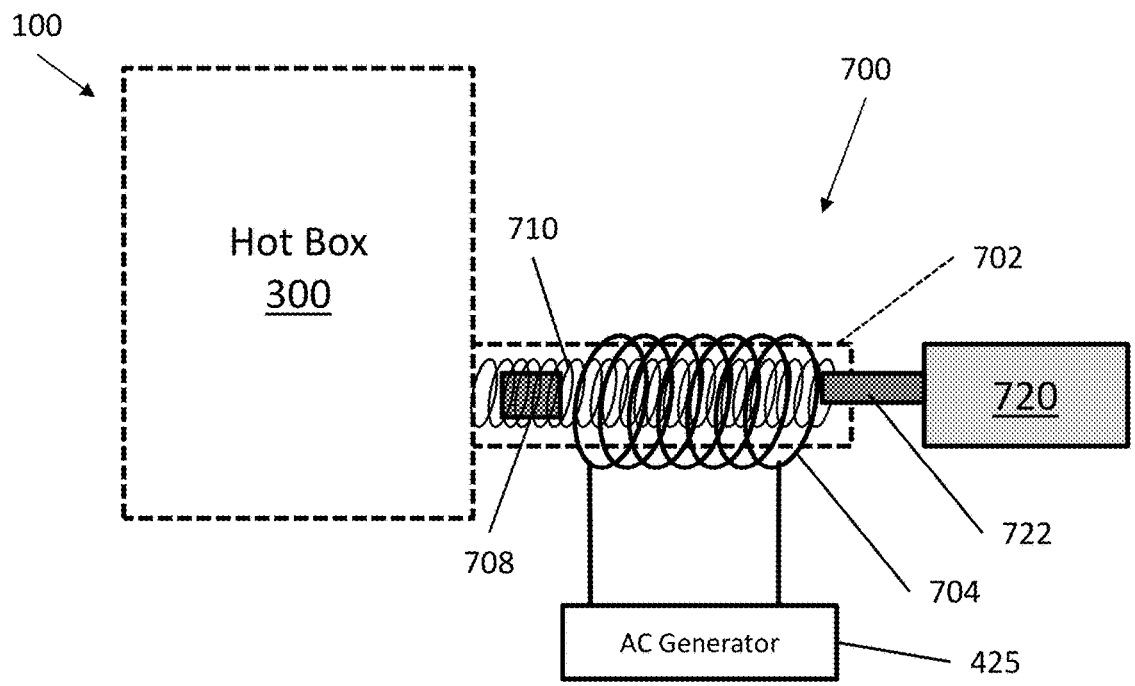

FIGS. 7A and 7B are schematic diagrams of a fuel cell system 100, including an electromagnetic induction glow plug 700, according to various embodiments of the present disclosure. The glow plug 700 has been enlarged for illustrative purposes and includes elements similar to the elements described with respect to the glow plug 500 of FIG. 5A, so only differences there between will be discussed in detail.

Referring to FIGS. 7A and 7B, the glow plug 700 includes a housing 702 extending from the hotbox 300. The housing 702 may be formed of a dielectric material. A primary coil 704 is disposed around the housing 702 and connected to an AC generator 425.

A secondary coil 710 is disposed inside of the housing 702. A heating element 708 is disposed within the secondary coil 710. The heating element 708 may not be in direct electrical contact with the secondary coil 710. For example, the heating element 708 may be covered with a dielectric material.

An actuator 720 is disposed adjacent to the housing 702 and may be configured to move the heating element 708 and optionally the secondary coil 710, into and out of the hotbox 300. In some embodiments, the actuator 720 may include a positioning arm 722 that is configured to move the heating element 708 into and out of the hotbox 300.

In operation, the AC generator 425 is configured to apply a high-frequency AC voltage to the primary coil 704. An electric field generated by the AC voltage induces a corresponding AC voltage in the secondary coil 710. An electric field generated by the secondary coil 710 results in resistive heating of the heating element 708.

As shown in FIG. 7A, the actuator 720 may be configured to move both the secondary coil 710 and the heating element 708 into a reaction zone of the hotbox 300, while the heating element 708 is inductively heated or resistively heated. Accordingly, the heating element may heat and/or ignite a fuel/air mixture in the reaction zone.

As shown in FIG. 7B, after combustion and/or heating of the fuel/air mixture, the actuator 720 may be configured to pull the secondary coil 710 and the heating element 708 out of the hotbox 300. For example, the actuator 720 may be configured to pull the secondary coil 710 and the heating element 708 into the housing 702, which may maintain the secondary coil 710 and the heating element 708 at temperatures lower than the temperatures inside the hotbox 300, during steady-state operation of the fuel cell system. As such, the secondary coil 710 and/or heating element 708 may be protected from high-temperature operating conditions and/or oxidation that would occur inside the hotbox 300.

Figure 8A:
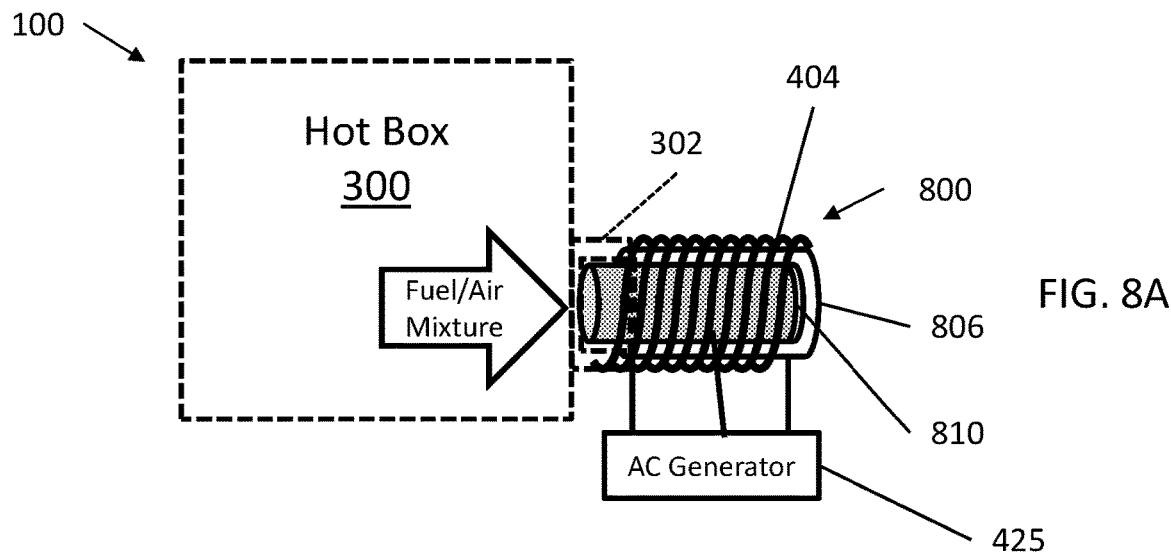
FIG. 8A is a schematic diagram of a fuel cell system including an electromagnetic induction glow plug, according to various embodiments of the present disclosure.
Figure 8B:
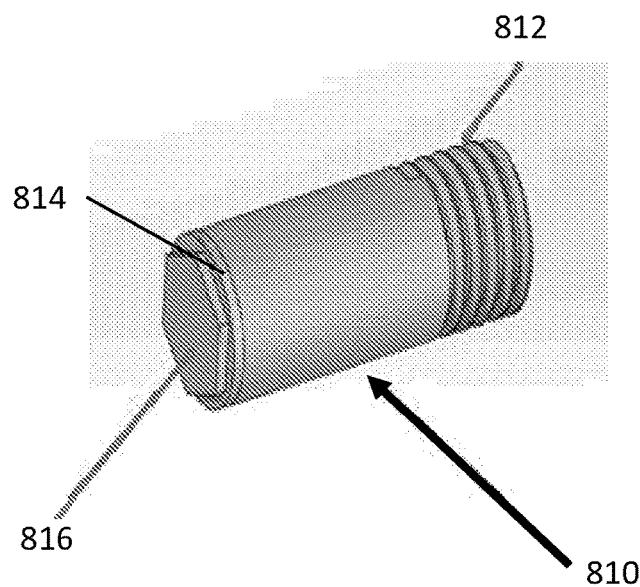
FIG. 8B is a perspective view of a heating element of the glow plug of FIG. 8A.
Figure 8C:
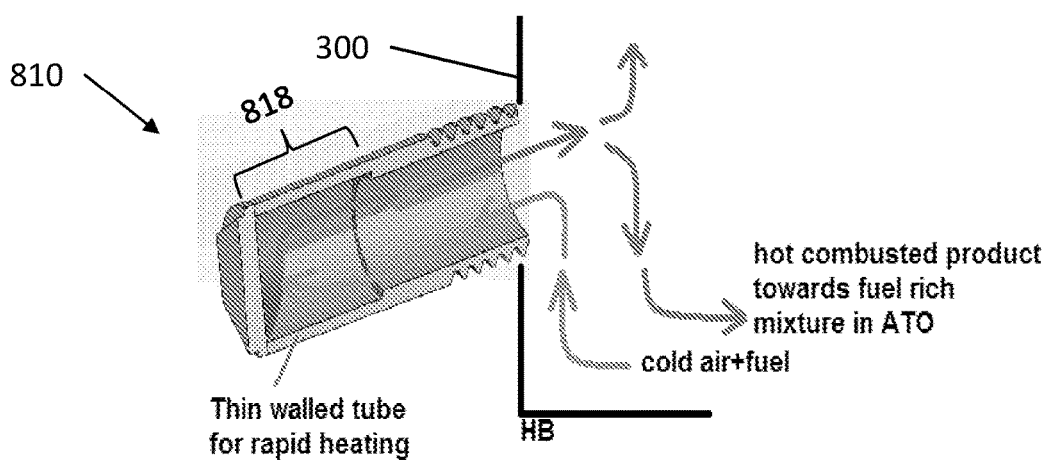
FIG. 8C is a sectional view showing the operation of the heating element in a hotbox of FIG. 1.

FIG. 8A is a schematic diagram of a fuel cell system 100 as described above, including an electromagnetic induction glow plug 800, according to various embodiments of the present disclosure, FIG. 8B is a perspective view of a heating element 810 of the glow plug 800 of FIG. 8A, and FIG. 8C is a sectional view of the heating element 810 during operation. The glow plug 800 has been enlarged for illustrative purposes.

Referring to FIGS. 8A-8C, the glow plug 800 includes a sheath 806 disposed around a heating element 810, and an electrically conductive coil 404 wrapped around the sheath 406 and connected to an AC generator 425. The sheath 806 may be formed of a dielectric material having high heat resistance, such as a ceramic or quartz material. The coil 404 may be configured to inductively heat the heating element 810, and there by heat and/or ignite a fuel/air mixture in a reaction chamber of the hotbox 300 of the fuel cell system 100.

The heating element 810 may be formed of any ferromagnetic material having a relatively high magnetic permeability and oxidation resistance. For example, the heating element 810 may be formed of an Inconel alloy, 446 stainless steel, or a mu metal (e.g., a Ni—Fe based soft magnetic alloy), or the like.

The heating element 810 may be shaped as a hollow cylinder having a threaded open end 812 and an opposing closed end 814. The threaded open end 812 may be configured to mate with a threaded inlet port 302 of the hotbox 300, so as to form a fluid-tight connection therebetween. For example, the inlet port 302 may be similar to a glow plug port configured to receive a conventional glow plug. Therefore, the glow plug 800 may be retrofit onto a conventional fuel cell system hotbox. In some embodiments, the heating element 810 may be welded to the inlet port 302.

The closed end 814 of the heating element 810 may include a hexagonal protrusion 816 configured to fit a conventional hex socket, to facilitate removal and insertion of the heating element 810 with respect to the inlet port 302. A portion 818 of the sidewall of the heating element 810 adjacent to the closed end 814 may be thinner than other portions of the heating element 800, in order to facilitate rapid induction heating thereof. For example, the portion 818 may have a thickness ranging from about 0.5 mm to about 3 mm, such as from about 1.0 mm to about 2.0 mm, or about 1.5 mm. The portion 818 may have a length that ranges from about 25% to about 60% of the length of the heating element 810, such as a length that is about 50% of the length of the heating element 810.

During system startup, a mixture of cold air and fuel may flow inside of the heating element 810. Inductive heating of the heating element 810, and in particular heating of the relatively thin portion 818 of the heating element 810 may initiate oxidation of the mixture. The resulting hot oxidation products may then be provided to the ATO of the system 100 to initiate an oxidation reaction in the ATO. In an alternative embodiment, the glow plug 800 may be used in a CPDX reactor.

The glow plug 800 may be heated to a temperature of about 700° C. in about 5 minutes or less, and to a temperature of about 830° C. in about 30 minutes.

Figure 9A:
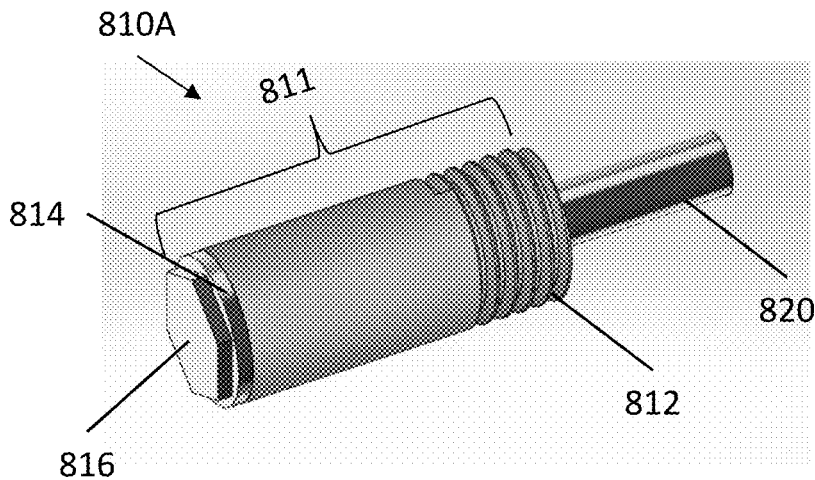
FIG. 9A is a perspective view of a modified heating element that may be included in the glow plug of FIG. 8A.
Figure 9B:
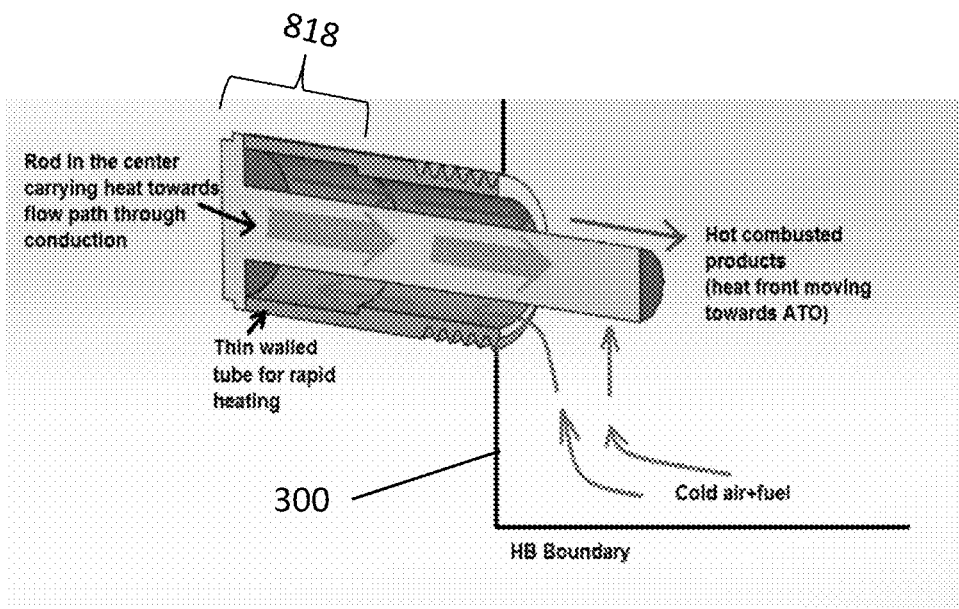
FIG. 9B is a sectional view of the heating element during operation when disposed in a hotbox of FIG. 1.
Figure 9C:
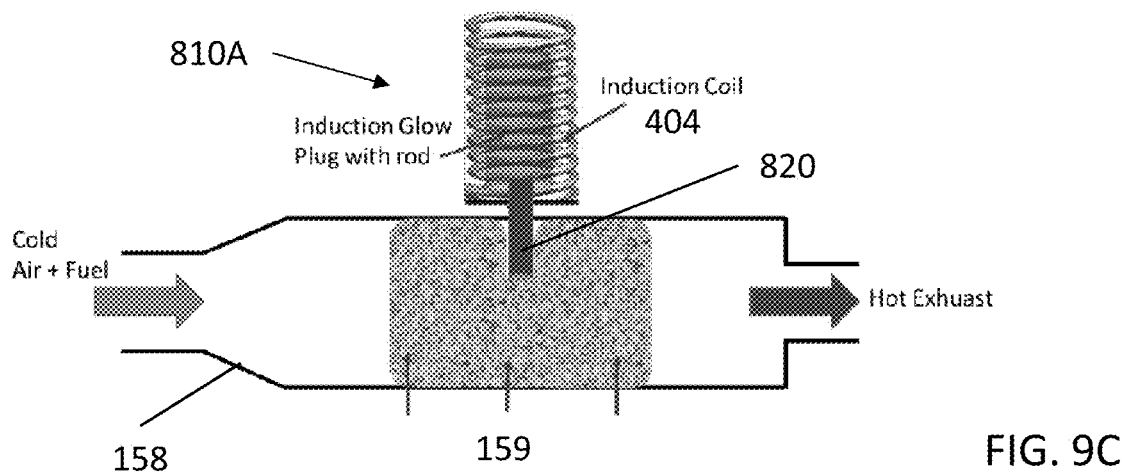
FIG. 9C is a schematic view showing the operation of the glow plug in a CPDX reactor of FIG. 1.

FIG. 9A is a perspective view of a modified heating element 810A that may be included in the glow plug 800 of FIG. 8A, FIG. 9B is a sectional view of the heating element 810A during operation when disposed in a hotbox 300 of FIG. 1, and FIG. 9C is a schematic view showing the glow plug 810A in a CPDX reactor 158 of FIG. 1. The heating element 810A is similar to the heating element 810, so only differences therebetween will be described in detail.

Referring to FIGS. 9A and 9B, the heating element 810A is formed of an electrically conductive ferromagnetic material and includes a hollow cylindrical body 811 having an open threaded end 812 and an opposing closed end 814. The threaded end 812 may be configured to mate with a threaded inlet port 302 of the hotbox 300, so as to form a fluid-tight connection therebetween. The closed end 814 may include a hexagonal protrusion 816 configured to fit a conventional hex socket. A portion 818 of the sidewall of the heating element 801 adjacent to the closed end 814 may be thinner than other portions of the heating element 800.

In contrast to the heating element 810, the heating element 810A includes a central rod 820 disposed inside the body 811. The central rod 820 extends from the closed end 814 and out through the open end 812, such that an end of the central rod 820 is exposed outside of the cylindrical body 811. The central rod 820 may be configured to conduct heat generated in the relatively thin-walled portion 818 toward the exposed end of the central rod 820.

Accordingly, during operation, the heating element 810A may be configured to heat a portion of a fuel and air mixture that enters the cylindrical body 811, and may also be configured to heat a portion of the mixture that flows past the exposed end of the central rod 820, without entering the cylindrical body 811. Thus, the central rod 820 keeps the oxidized fuel mixture hot as it exits the cylindrical body into the ATO or CPDX reactor. Thus, the glow plug containing the central rod 820 may permit the oxidation reaction to occur in a shorter time than the glow plug shown in FIG. 8C which lacks the central rod, as the heat generated within the cylindrical body 811 walls can be conducted through the central rod 820 further inside flow path.

Referring to FIG. 9C, in some embodiments, the glow plug 810A may be disposed on the CPDX reactor 158, such that the central rod 820 extends into the CPDX reactor 158. In particular, the central rod 820 may be disposed within a CPDX catalyst 159 of the CPDX reactor 158. During startup, the glow plug 810A may be configured to heat a fuel and air mixture flowing through the catalyst 159, to initiate a partial oxidation reaction.

Figure 10A:
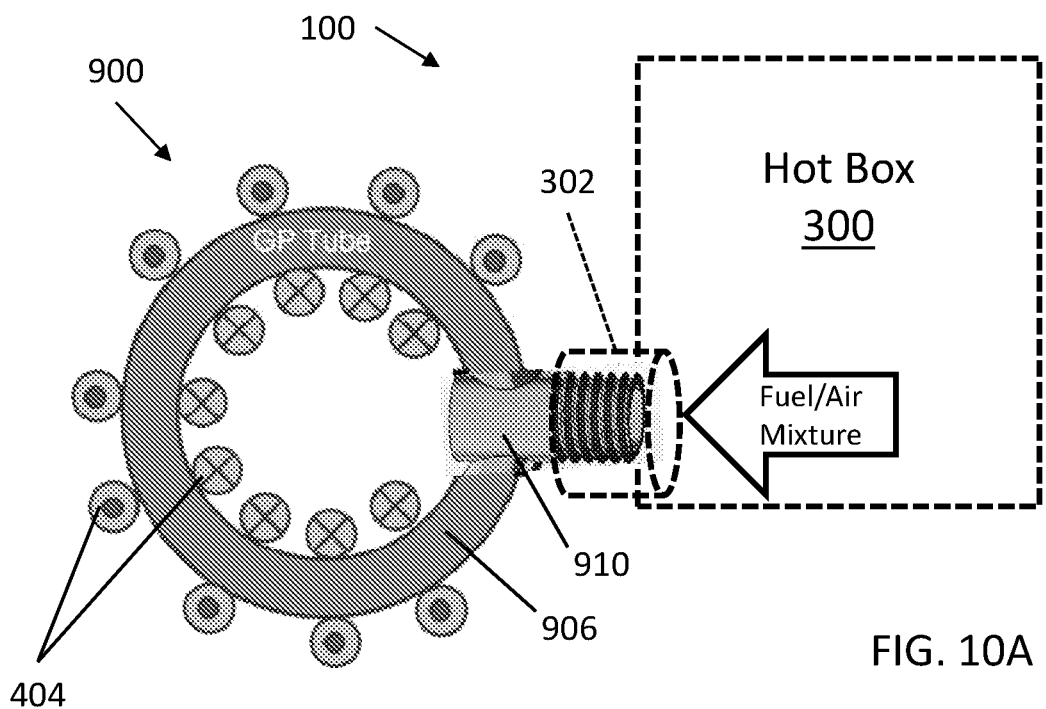
FIG. 10A is a schematic diagram of a fuel cell system including an electromagnetic induction glow plug, according to various embodiments of the present disclosure.
Figure 10B:
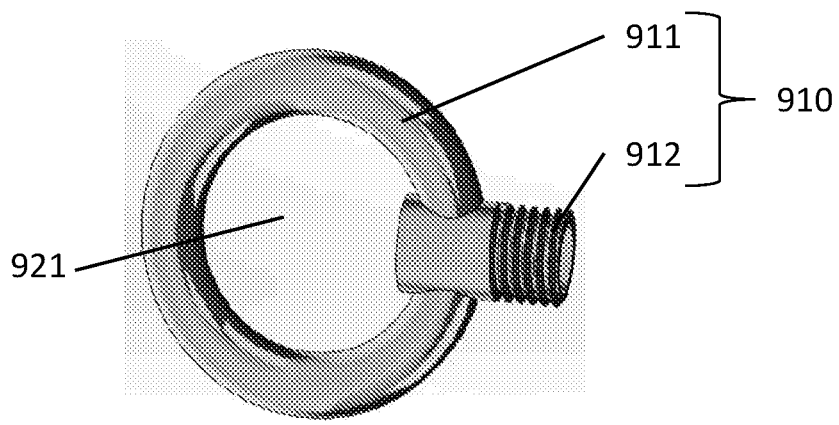
FIG. 10B is a perspective view of an electrically conductive heating element of the glow plug of FIG. 10A.
Figure 10C:
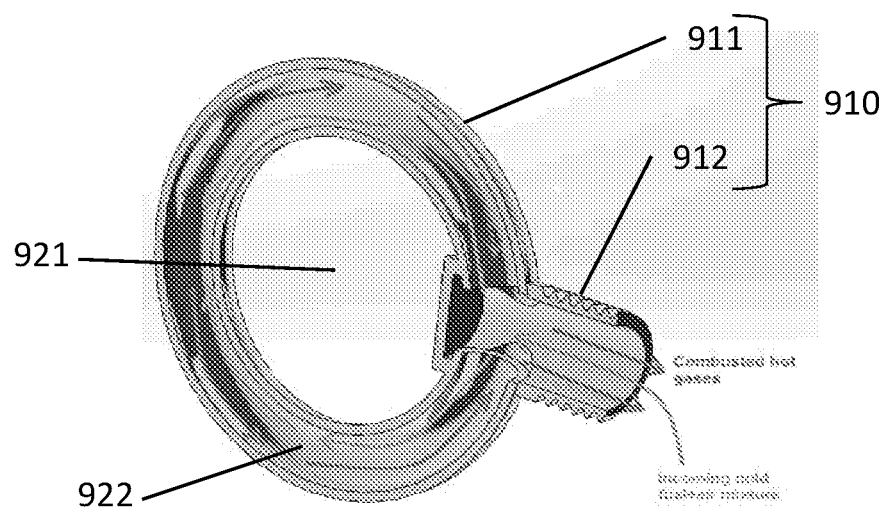
FIG. 10C is a sectional view of the heating element during operation.

FIG. 10A is a schematic diagram of a fuel cell system 100, including an electromagnetic induction glow plug 900, according to various embodiments of the present disclosure, FIG. 10B is a perspective view of an electrically conductive heating element 910 of the glow plug 900 of FIG. 10A, and FIG. 10C is a sectional view of the heating element 910 during operation. The glow plug 900 has been enlarged for illustrative purposes and includes elements similar to the elements described with respect to the glow plug 800 of FIG. 8A, so only differences there between will be discussed in detail.

Referring to FIGS. 10A-10C, the glow plug 900 includes a sheath 906 wrapped around the heating element 910, and a coil 404 wrapped around the sheath 906 and connected to an AC generator (not shown). The sheath 906 may be formed of a dielectric material having high heat resistance, such as a ceramic tape wrapped around the heating element 910. The coil 404 may be configured to inductively heat the heating element 910, and there by heat and/or ignite a fuel/air mixture in a reaction chamber of the hotbox 300.

The heating element 910 may include a hollow toroidal body 911 (e.g., a hollow annular body) and a threaded connector 912. The hollow toroidal body 911 may have any suitable cross sectional shape when viewed perpendicular to the axis which extends through the hole 921 in the torus, such as a circular cross sectional shape shown in FIG. 10C, an oval cross sectional shape, a polygonal cross sectional shape or an irregular cross sectional shape. The toroidal body 911 may be fluidly connected to the threaded connector 912. The threaded connector 912 may be configured to mate with a threaded inlet port 302 of the hotbox 300, so as to form a fluid-tight connection therebetween. For example, the inlet port 302 may be similar to a glow plug port configured to receive a conventional glow plug. Therefore, the glow plug 900 may be retrofit onto a conventional fuel cell system hotbox.

During system startup, a mixture of cold air and fuel may flow inside of the heating element 910. For example, the mixture of cold air and fuel may flow inside the pathway 922 surrounded by the hollow toroidal body 911, as shown in FIG. 10C, rather than through the hole 921 in the middle of the toroidal body 911. Inductive heating of the heating element 910, and in particular heating of the toroidal body 911 of the heating element 910 may initiate oxidation of the mixture. The resulting hot oxidation products may then be provided to the ATO or CPDX reactor of the system 100 to initiate an oxidation reaction.

The hollow toroidal body 911 can house more of the gas mixture within it than the hollow cylindrical body 810 or 810A, and also provides for an ideal geometry to soak up electromagnetic induction from the coil 404. The glow plug 900 containing the hollow toroidal body may be heated to a temperature of about 700° C. in less than one minute (e.g., about 15 to 20 seconds), and to a temperature of about 830° C. in less than one minute (e.g., about 20 to 25 seconds). Thus, the toroidal glow plug 900 provides a significantly higher temperature ramp rate compared to the linear (i.e., cylindrical) glow plug 800 containing the hollow cylindrical body 810 or 810.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell system comprising:
   a fuel cell stack and a reaction zone configured to receive a fuel/air mixture;
   an electromagnetic induction glow plug configured to heat the fuel/air mixture;
   an alternating current (AC) generator configured to provide an AC voltage to the glow plug;
   a hot box housing the fuel cell stack; and
   an anode tail gas oxidizer (ATO) comprising the reaction zone and disposed in the hotbox;
   wherein the glow plug comprises:
      a housing extending outside of the hotbox;
      a heating element disposed in the housing; and
      a coil electrically connected to the AC generator, coiled around the housing, and configured to inductively heat the heating element.

2. The system of claim 1, wherein the housing comprises a closed end disposed outside of the hotbox and an opposing open end exposed to the fuel/air mixture in the ATO.

3. The system of claim 1, wherein:
   the heating element comprises a ferromagnetic material; and
   the heating element is disk-shaped.

4. The system of claim 1, wherein the housing is configured to electrically insulate the coil from the heating element.

5. The system of claim 1, further comprising an electrically insulating sheath disposed between the housing and the coil,
   wherein the housing is electrically conductive.

6. The system of claim 1, wherein:
   the heating element comprises an end of an inlet port of the hot box; and
   the housing is configured to electrically insulate the coil from the heating element.

7. A fuel cell system comprising:
   a fuel cell stack and a reaction zone configured to receive a fuel/air mixture;
   an electromagnetic induction glow plug configured to heat the fuel/air mixture;
   an alternating current (AC) generator configured to provide an AC voltage to the glow plug;
   a hot box housing the fuel cell stack; and
   an anode tail gas oxidizer (ATO) comprising the reaction zone and disposed in the hotbox;
   wherein the glow plug comprises:
      a housing extending from the hotbox;
      a heating element disposed in the housing;
      a secondary coil disposed in the housing, coiled around the heating element, and configured to inductively heat the heating element; and
      a primary coil wrapped around the housing, electrically connected to the AC generator, and configured to induce an AC voltage in the secondary coil.

8. The system of claim 7, further comprising an actuator configured to extend the heating element into the hotbox, and to retract the heating element from the hotbox and into the housing, wherein the actuator is configured to extend the heating element during startup of the system and to retract the heating element during steady-state operation of the fuel cell system.

9. The system of claim 7, wherein the housing is configured to electrically insulate the primary and secondary coils.

* * * * *